United States Patent [19]

Hundt et al.

[11] Patent Number: 4,603,997
[45] Date of Patent: Aug. 5, 1986

[54] SUPPORT RING FOR A TORSIONAL VIBRATION BALANCER WHICH CAN BE FASTENED TO A SHAFT

[75] Inventors: Werner Hundt, Munich; Bernd Wagner, Höhr-Grenzhausen, both of Fed. Rep. of Germany

[73] Assignee: Metzeler Kautschuk GmbH, Munich, Fed. Rep. of Germany

[21] Appl. No.: 697,844

[22] Filed: Feb. 4, 1985

[30] Foreign Application Priority Data

Feb. 3, 1984 [DE] Fed. Rep. of Germany ....... 3403858

[51] Int. Cl.$^4$ ................................................ F16D 1/00
[52] U.S. Cl. ...................................... 403/228; 74/574; 267/141.4
[58] Field of Search ............... 403/228, 220, 365, 224, 403/225; 267/141.4, 141.2, 141.3; 74/574

[56] References Cited

U.S. PATENT DOCUMENTS 1,831,628 11/1931 Kuenzel ........................ 403/228 X
4,114,472 9/1978 Hornig et al. ....................... 74/574

FOREIGN PATENT DOCUMENTS

838473 6/1960 United Kingdom ............... 403/220
1162947 9/1969 United Kingdom ............... 403/328
1551850 9/1979 United Kingdom ............... 403/224

Primary Examiner—Andrew V. Kundrat
Attorney, Agent, or Firm—Herbert L. Lerner; Laurence A. Greenberg

[57] ABSTRACT

A support ring assembly includes a support ring formed of synthetic material to be fastened on a shaft for a balancer of torsional vibrations, the support ring having lateral surfaces and a plurality of openings formed therein, and a plurality of metal fastening bushings disposed in the openings, the bushings having end surfaces aligned with the lateral surfaces, and the bushings including devices for locking the bushings into the support ring.

19 Claims, 10 Drawing Figures

SUPPORT RING FOR A TORSIONAL VIBRATION BALANCER WHICH CAN BE FASTENED TO A SHAFT

The invention relates to a synthetic support ring for a rotational or torsional vibration balancer or damper which can be fastened to a shaft, especially for a reciprocating or piston engine, having openings for receiving fastening elements.

A support ring of this type is disclosed in German Petty Patent DE-GM No. 7 901 384, and is provided with openings for fastening elements, which will not be described in any further detail below.

A rotational vibration damper which is generally used for damping the rotational vibrations of a reciprocating motor, such as in a motor vehicle, is exposed to high tangential acceleration forces and axial vibrations, which can vary greatly depending on operating conditions. For example, the engine may run cold or hot, or operate with a low or high number of revolutions, so that great additional loads are generated. The conventional measures for fastening such support rings made of synthetic material are not satisfactory, so that on some occasions the support ring along with the rotational vibration damper separate from the shaft, even after being in use only for a short time.

It is accordingly an object of the invention to provide a support ring for a rotational vibration damper which can be fastened to a shaft, which overcomes the hereinafore-mentioned disadvantages of the heretofore-known devices of this general type. In particular, the fastening arrangement of the support ring is to withstand even greater loads, so that it cannot become loose even after long usage.

With the foregoing and other objects in view there is provided, in accordance with the invention, a support or carrier ring assembly, comprising a support ring formed of synthetic material to be fastened on a shaft for a balancer or damper of rotational or torsional vibrations, especially for a reciprocating or piston engine, the support ring having lateral surfaces and a plurality of openings formed therein, and a plurality of metal fastening bushings having end surfaces aligned with the lateral surface, and the bushings including means for locking the bushings into the support ring.

The advantages obtained by practicing the invention lie especially in the fact that several metal bushings are disposed or molded in the support ring and are distributed along a circle in the support ring. The end surfaces of these metal bushings are flush with the lateral surfaces of the support ring, so that fastening elements, such as screws, can be solidly held in the bushings, but do not contact the support ring itself, and especially do not apply pressure forces onto the support ring.

For this purpose, three embodiments are possible: In a first version, the individual metal bushings are separated from each other, and are provided with at least one wing-like projection, which extends radially outwardly from the metal bushings. In a second version, the metal bushings are anchored or connected in a ring disc. In a third version, the support ring is molded with through holes into which bushings are inserted, such as by ultrasonic bonding, so that these bushings have a profiled or knurled surface.

The essential point is that a very large and defined contact area is generated between the metal bushings and the synthetic material of the support ring, i.e. large contact areas with a defined form, which provide a form-locking and force-locking connection between the metal bushings and the plastic ring, and thereby guarantee a reliable holding of the metal bushings in the synthetic material. A form-locking connection is one in which parts are held together by virtue of their shape, without requiring external force. A force-locking connection requires external force.

In accordance with another feature of the invention, the locking means increase the area of the bushings, i.e. they are areal or laminar elements.

In accordance with a further feature of the invention, the locking means are form-lockingly connected to the support ring. In accordance with an added feature of the invention, the metal bushings are integrally cast, molded or fused, into the support ring.

In accordance with an additional feature of the invention, the bushings are distributed about the support ring along a circle, and the locking means are in the form of at least one wing-shaped outwardly-directed projection each having a relatively large area as compared to the remainder of the bushing.

In accordance with again another feature of the invention, each of the bushings includes two projections disposed at substantially 90° to each other.

In accordance with again a further feature of the invention, each of the projections has a hole formed therethrough.

In accordance with again an added feature of the invention, there is provided an annular disc having the bushings disposed therein.

In accordance with again an additional feature of the invention, the annular disc has radial bulges formed thereon at least in vicinity of the metal bushings.

In accordance with yet another feature of the invention, the annular disc has a wavy or wave-shaped outer contour.

In accordance with yet a further feature of the invention, the annular disc has radial chamfers formed thereon.

In accordance with yet an added feature of the invention, the annular disc has additional openings formed therein.

In accordance with yet an additional feature of the invention, the annular disc has waves formed therein in the circumferential direction.

In accordance with still another feature of the invention, the annular disc is fastened to one of the lateral surfaces of the support ring by fusing, adhesive, bonding or welding.

In accordance with still a further feature of the invention, the annular disc is integrally cast or molded into the support ring.

In accordance with still an added feature of the invention, the metal bushings have profiled surfaces.

In accordance with a concomitant feature of the invention, the metal bushings have a knurled or cross-knurled surface.

Other features which are considered as characteristic for the invention are set forth in the appended claims.

Although the invention is illustrated and described herein as embodied in a support ring for a rotational vibration damper which can be fastened to a shaft, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

Figure 6:
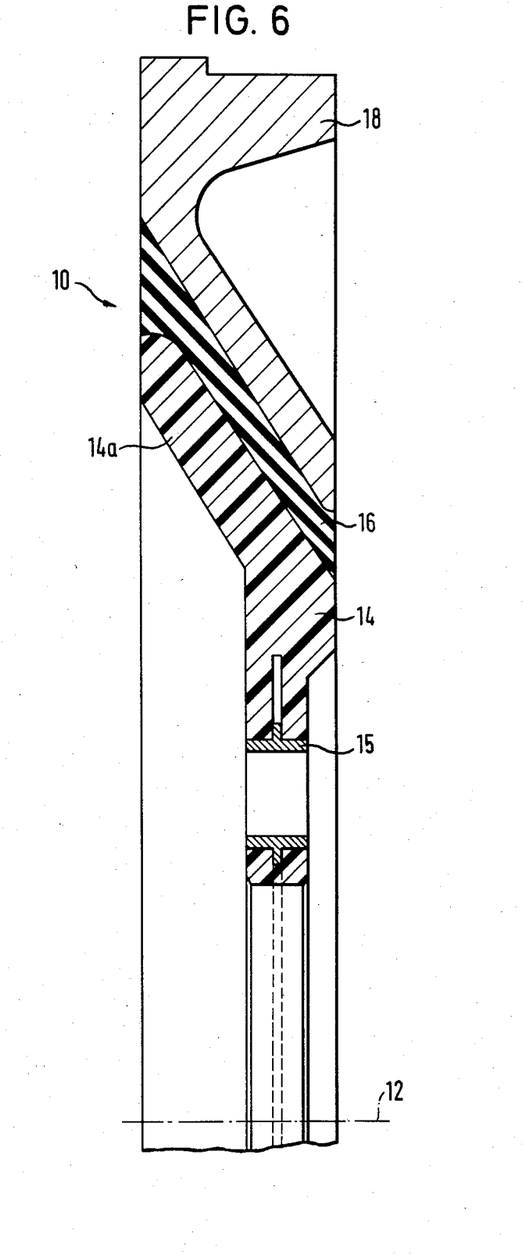
FIG. 6 is a fragmentary cross-sectional view of a rotational vibration damper.

Referring now to the figures of the drawing in detail and first particularly to FIG. 6 thereof, there is seen a balancer or damper for torsional vibrations, which is designated as a whole by reference symbol 10 and which sits on a crankshaft 12. A support ring 14 which is made of reinforced plastic, especially polyester or polyamide is attached to the damper 10 by fastening means which will be explained further below. The support ring 14 has a radial flange 14a which is surrounded by a ring 16 of elastomer material, especially rubber. The elastomer ring 16 is surrounded by a fly wheel 18 which serves as a heavy or inertial mass.

FIG. 6 also shows a bushing 15 which is inserted or molded into the support ring 14. The bushing 15 has end walls which are flush with the lateral surfaces of the support ring 14 and serves for fastening onto the corresponding hub of the crankshaft 12. If a bolt is inserted through the hole formed in the bushing 15, the bolt contacts the end surfaces of the bushings 15, and therefore does not directly affect the plastic material of the support ring 14.

Figure 1:
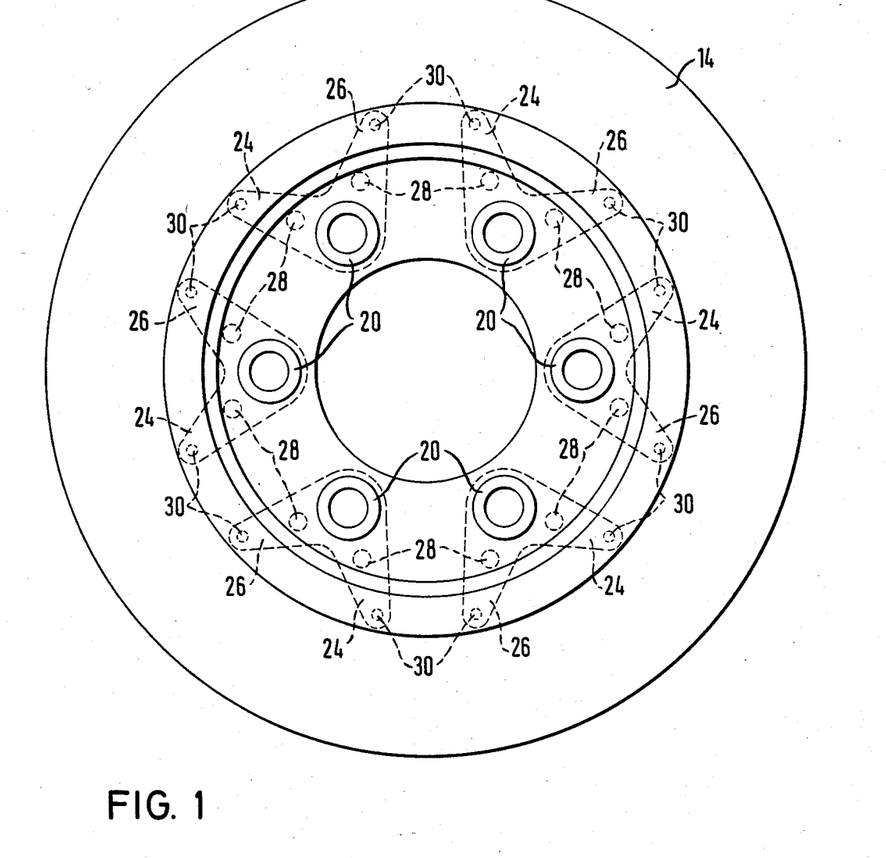
FIGS. 1 to 5 are top-plan and partial cross-sectional views of five different embodiments of a support ring according to the invention.

FIG. 1 shows the first embodiment of a support ring 14, and its fastening means. A total of six separate cylindrical bushings 20 are provided, each having individual radially outwardly extending wing-like projections 24, 26. These projections have additional openings 28 which are filled by the synthetic material of the support ring.

A very large contact area is thus created between the bushing 20 and the wings 24, 26 with the openings 28, 30, and the plastic material of the support ring 14, so that even strong shocks, vibrations and bumps are absorbed and transferred without difficulty.

Figure 2:
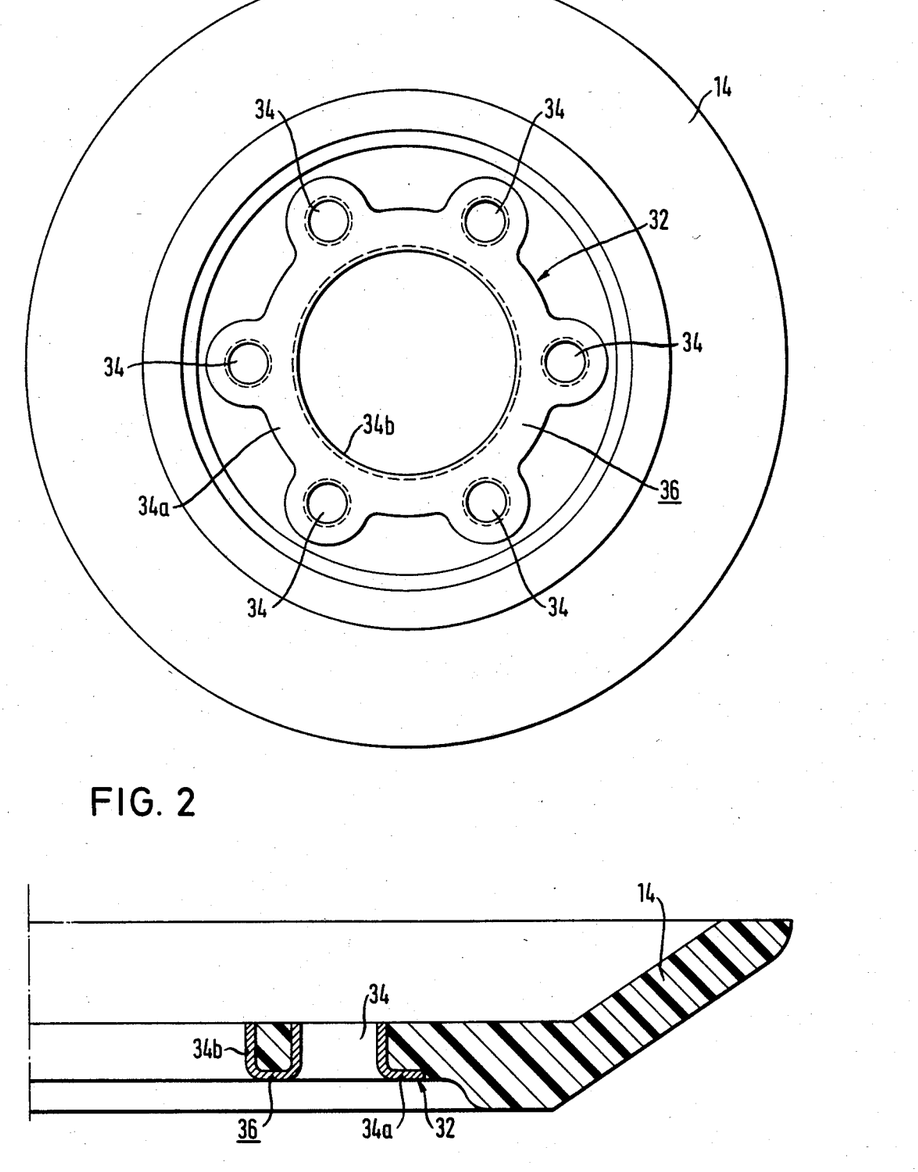

Whereas the embodiment according to FIG. 1 has individual bushings 20 with wing-like projections 24, 26, the support ring 14 according to FIG. 2 is constructed in the form of a ring disc 32 which is cast or molded into the support ring and is provided with bushings 34. As is shown in the cross-sectional portion of FIG. 2, the ring disc is stamped out of a sheet metal blank, thereby forming the bushings 34. A radially outwardly extending short flange 34a is adjacent the bushings 34 and it is followed by a metal collar 34b which serves as the contact surface of the crankshaft 12.

Figure 3:
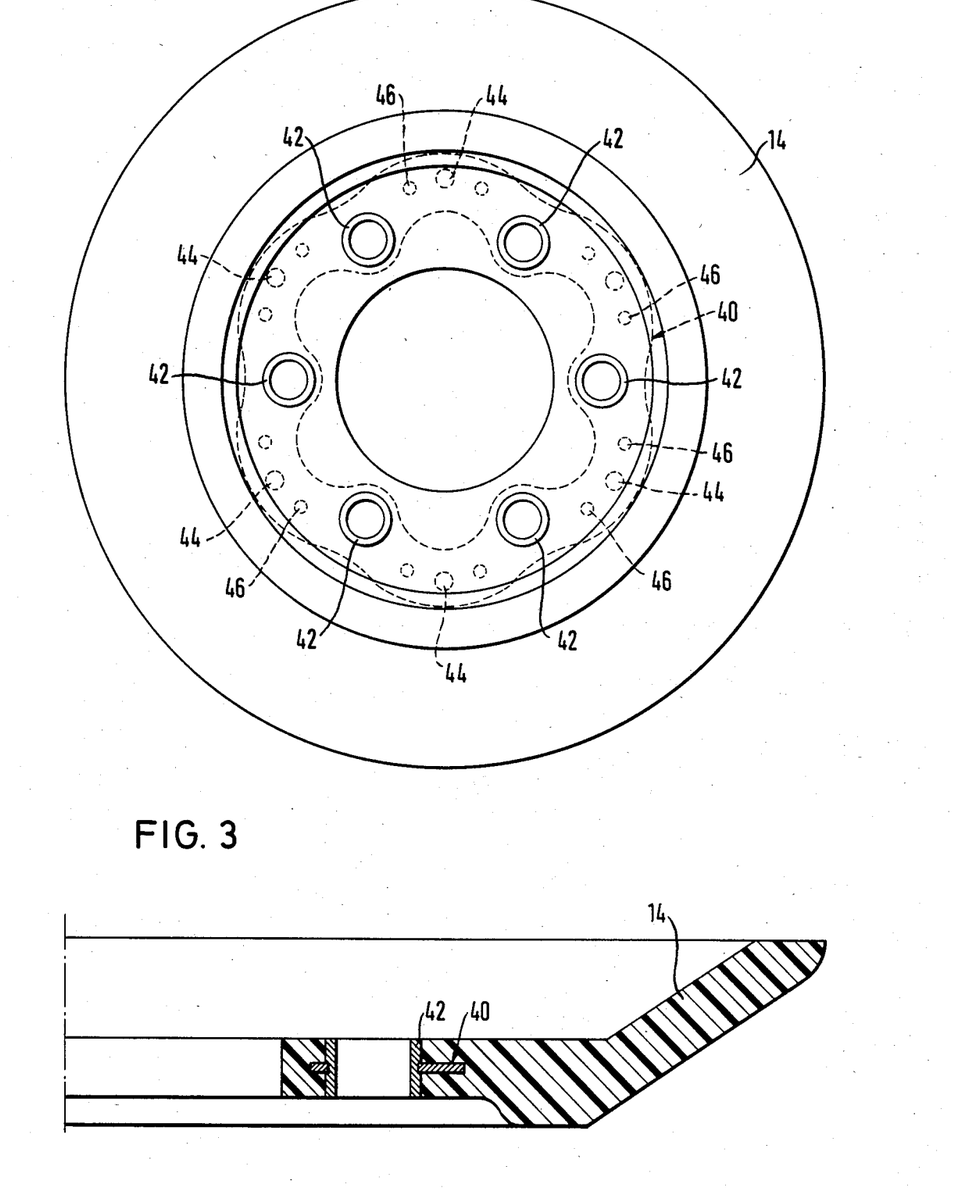

FIG. 3 shows an embodiment of a support ring 14, wherein the fastening is also effected by a flat ring disc 40 which has a wavy periphery but a flat surface, and is formed in one piece with the associated bushings 42. Additional holes 44, 46 are punched into the ring disc 40. This also results in a large contact area.

Figure 4:
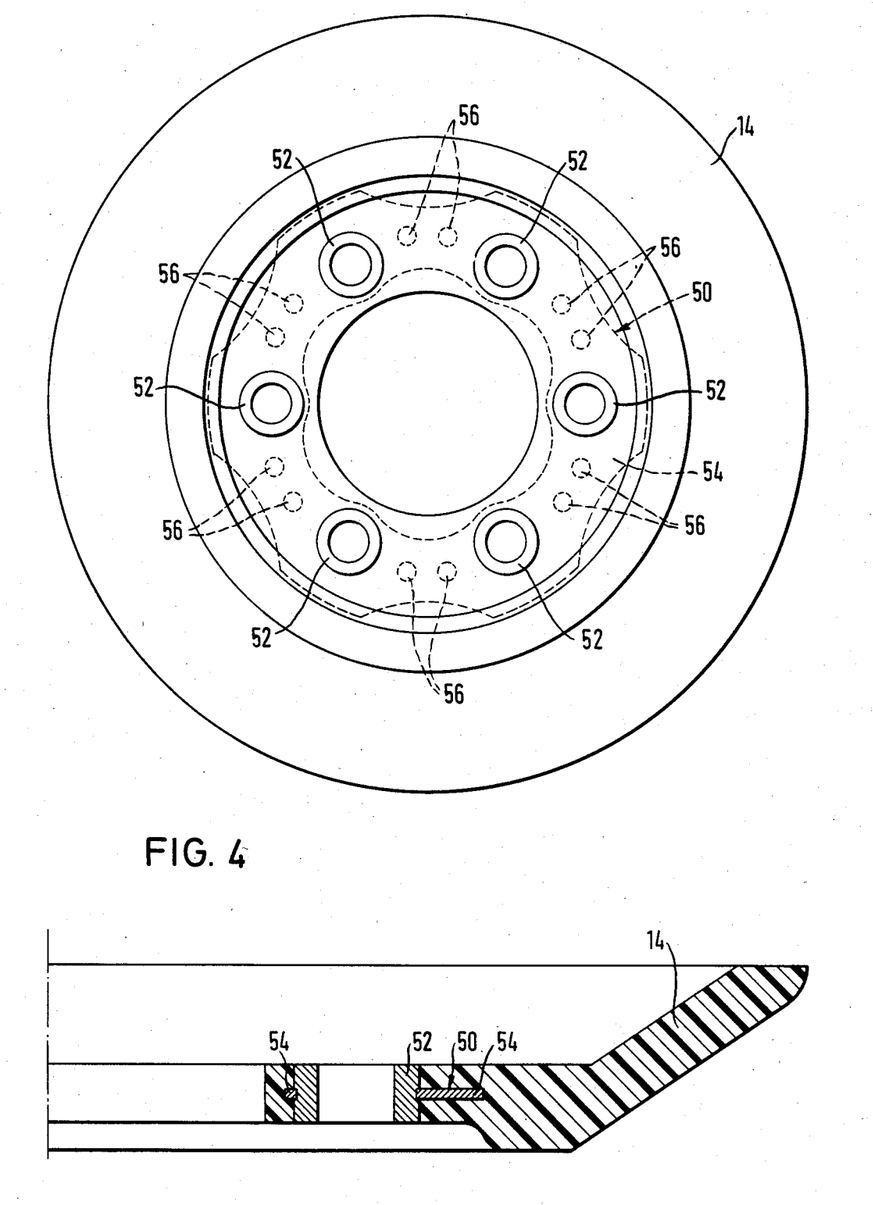

FIG. 4 shows an embodiment of a support ring wherein the fastening means, designated as a whole by reference symbol 50, is provided with a ring disc 54 into which six bushings 52 are fitted. The ring disc has a wavy contour at its inner periphery and flattened projections at its outer periphery at locations where the bushings 52 are located. Furthermore, the ring disc 54 always has two holes 56 between the individual bushings 52.

Figure 5:
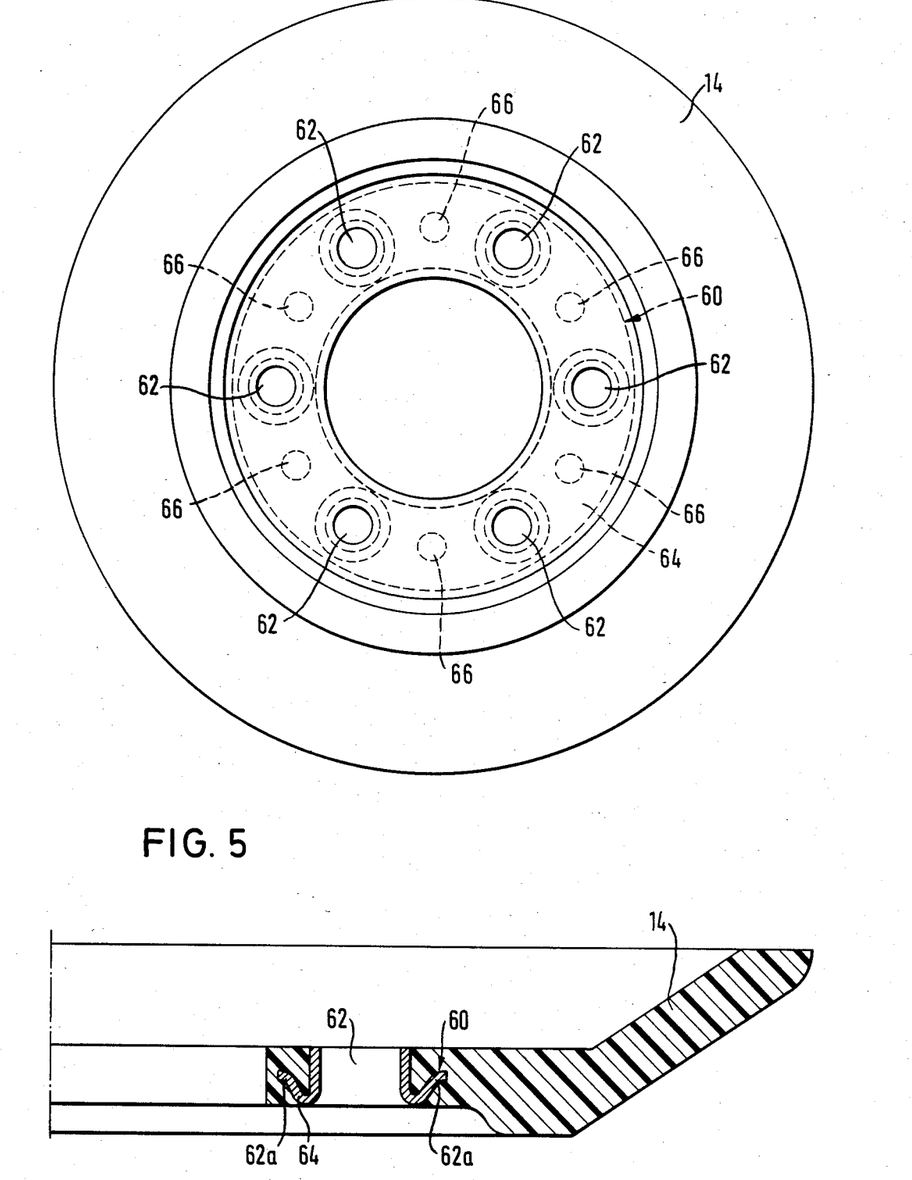

FIG. 5 shows another embodiment of a support ring 14 wherein fastening means 60 are constructed in the form of an annular disc 64, i.e. its inner and outer peripheries are circles. The annular disc is provided with bushings 62 and additional holes 66.

As is shown in the cross-sectional view at the bottom of FIG. 5, the annular disc 64 is bent outward, so that hook-shaped regions 62a are formed. This also results in a large contact area between the annular disc 64 with the bushings 62 on one hand and the plastic material of the support ring 14 on the other hand, as well as a good form-locking connection between these components.

In the embodiment form according to FIG. 2, a ring disc 36 is fastened to a lateral surface of the support ring 14. For example, the ring disc 36 may be cemented, welded or bonded to the support ring 14. In the other embodiments, the ring disc is cast or molded into the plastic material of the support ring 14, so that in practice it is placed in the geometrical center of the support ring 14.

The metal bushings and the ring disc can be manufactured in one piece by deepdrawing sheet steel.

Figure 7:
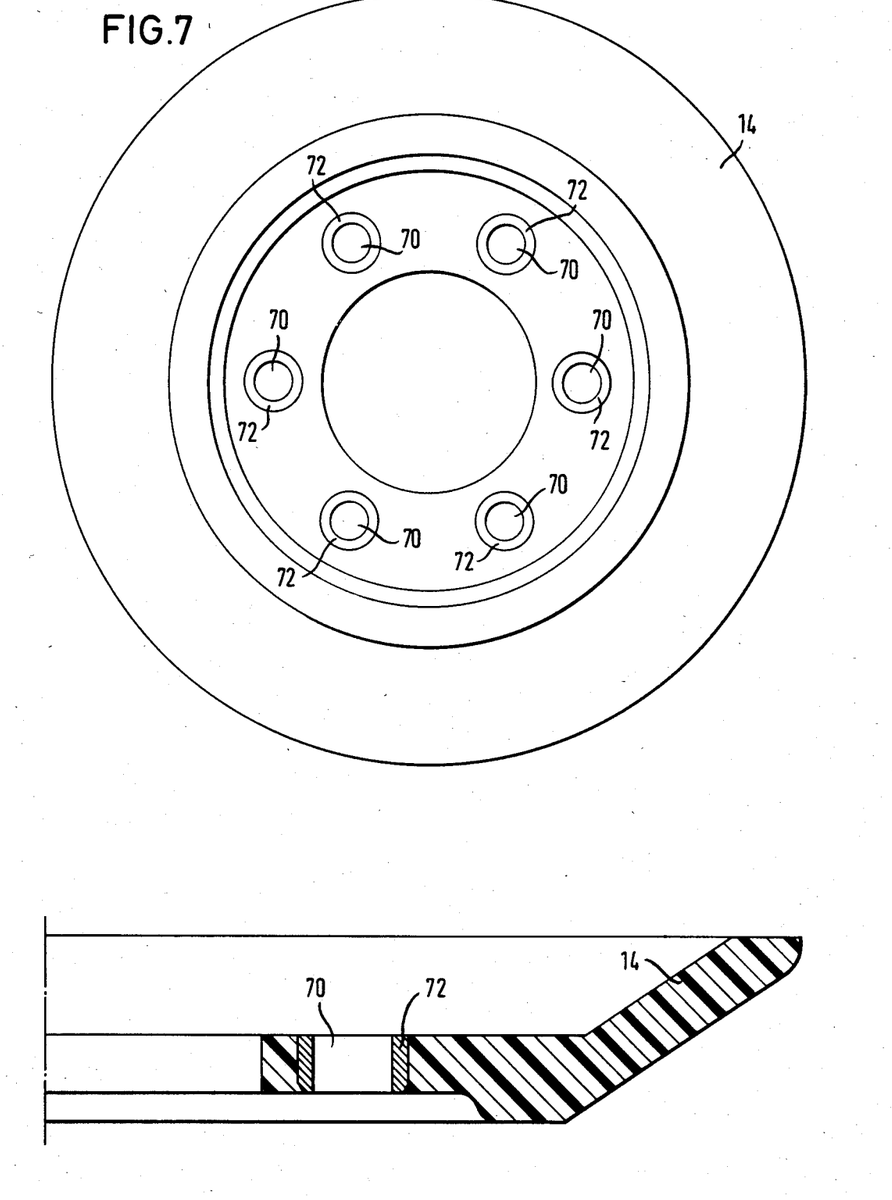
FIG. 7 is a top-plan and partial cross-sectional view of a sixth embodiment of a support ring.

FIG. 7 shows an embodiment of a support ring which is molded with six openings 70 having a precisely defined diameter, or in which holes are accurately machined later. After curing and removing the support ring 14 from the mold, metal bushings 72 are inserted into the holes or bushings 70, such as with the aid of ultrasonic bonding, so that the end surfaces of the bushings 72 are flush with the outer surfaces of the support ring 14, and the outer peripheries of the bushings are fitted to the inner peripheries of the holes 70, so that the bushings sit securely in the openings 70.

Figure 8:
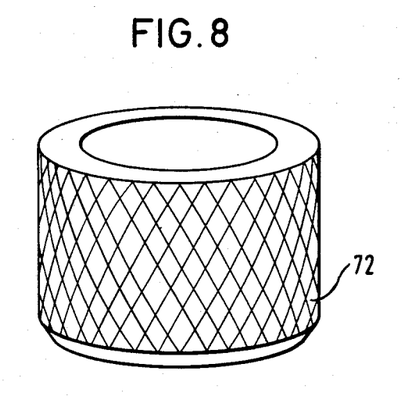
FIG. 8 is a prespective view of a metal bushing.
Figures 9, 10:
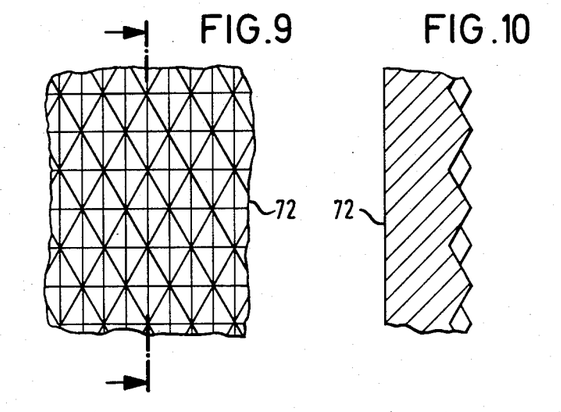
FIG. 9 is an enlarged fragmentary view of part of the surface of the metal bushing according to FIG. 8.
FIG. 10 is a fragmentary cross-sectional view of a part of the surface of the metal bushing according to FIG. 8 taken along the section line in FIG. 9.

As shown in FIGS. 8 to 10, the cylindrical outer surfaces of the metal bushings 72 are provided with a profile at the outside thereof, so that a reliable form-locking connection is created between the outer surfaces of the metal bushings 72 and the inner wall of the openings 70.

In the embodiment according to FIGS. 8 to 10, the profile is formed by a conventional cross-milled or knurled edge; however, if necessary, other profile forms may also be used, which guarantee the above-mentioned good form-locking connection between the holes 70 and the metal bushings 72.

The foregoing is a description corresponding in substance to German application No. P 34 03 858.2, filed Feb. 3, 1984, the International priority of which is being claimd for the instant application and which is hereby made part of this application. Any material discrepancies between the foregoing specification and the aforementioned corresponding German application are to be resolved in favor of the latter.

We claim:

1. Support ring assembly, comprising a support ring formed of synthetic material to be fastened on a shaft for a balancer of torsional vibrations, said support ring having lateral surfaces and a plurality of openings formed therein, and a plurality of metal fastening bushings disposed in said openings, sand bushings having end surfaces aligned with said lateral surfaces, said bushings being distributed about said support ring along a circle, and said bushings including means for locking said bushings into said support ring, said locking means being in the form of at least one wing-shaped outwardly-directed projection each having a relatively large area as compared to the remainder of said bushing.

2. Support ring according to claim 1, wherein said locking means increase the area of said bushings.

3. Support ring according to claim 2, wherein said locking means are form-lockingly connected to said support ring.

4. Support ring according to claim 1, wherein said metal bushings are integrally cast into said support ring.

5. Support ring according to claim 1, wherein each of said bushings includes two projections disposed at substantially 90° to each other.

6. Support ring according to claim 1, wherein each of said projections has a hole formed therethrough.

7. Support ring according to claim 5, wherein each of said projections has a hole formed therethrough.

8. Support ring assembly, comprising a support ring formed of synthetic material to be fastened on a shaft for a balancer of torsional vibrations, said support ring having lateral surfaces and a plurality of openings formed therein, and an annular disc having a plurality of metal fastening bushings disposed in said annular disc and in said openings in said support ring, said bushings having end surfaces aligned with said lateral surfaces, and said bushings including means for locking said bushings into said support ring.

9. Support ring according to claim 8, wherein said annular disc has radial bulges formed thereon at least in vicinity of said metal bushings.

10. Support ring according to clain 8, wherein said annular disc has a wavy outer contour.

11. Support ring according to claim 8, wherein said annular disc has radial chamfers formed thereon.

12. Support ring according to claim 8, wherein said annular disc has additional openings formed therein.

13. Support ring according to claim 8, wherein said annular disc has waves formed therein in the circumferential direction.

14. Support ring according to claim 8, wherein said annular disc is fastened to one of said lateral surfaces of said support ring by fusing.

15. Support ring according to claim 8, wherein said annular disc is fastened to one of said lateral surfaces of said support ring by adhesive.

16. Support ring according to claim 8, wherein said annular disc is integrally cast into said support ring.

17. Support ring according to claim 8, wherein said metal bushings have profiled surfaces.

18. Support ring according to claim 16, wherein said metal bushings have a knurled surface.

19. Support ring according to claim 16, wherein said metal bushings have a cross-knurled surface.

* * * * *